UNITED STATES PATENT OFFICE.

WILLIAM B. SEAL, OF BALTIMORE, MARYLAND.

PROCESS OF MAKING FERTILIZERS.

SPECIFICATION forming part of Letters Patent No. 445,255, dated January 27, 1891.

Application filed October 29, 1889. Serial No. 328,574. (Specimens.)

*To all whom it may concern:*

Be it known that I, WILLIAM B. SEAL, a citizen of Baltimore, in the State of Maryland, have invented certain new and useful Improvements in the Manufacture of Fertilizing Compounds; and I do hereby declare the following to be a full, clear, and exact description of the invention, such as will enable others skilled in the art to which it appertains to make and use the same.

My invention relates to an improvement in the manufacture of fertilizing compounds.

Heretofore in the manufacture of fertilizing compounds, the several ingredients having been mixed together in the mixing chamber or pan, the product was required to stand some time before it was in proper mechanical condition and dry enough for bagging, thus necessitating a great loss of time; and, further, in the manufacture of fertilizers different lots or batches are apt to vary in color, and thereby give purchasers reason for suspecting adulteration. To overcome this difficulty and have uniformity of color some manufacturers use soot and others the lamp-black of commerce; but the use of such materials has been found expensive.

It is the object of my present invention to overcome difficulties hitherto encountered in the manufacture of fertilizer and provide an improved fertilizer which shall be quick in drying and capable of being bagged for shipment within a day after being mixed with sulphuric acid.

A further object is to produce a fertilizing compound which shall be cheap in its process of manufacture and its uniform color be cheaply and easily regulated.

With these objects in view my invention consists in mixing in suitable quantities and in the manner hereinafter explained raw phosphate materials, sulphuric acid, powdered coal, and preferably nitrogenous materials, &c.

Raw phosphate material, inert in its raw state, is first powdered and put into the mixing-pan and treated with sulphuric acid. As the chemical changes are taking place in this vessel, finely-ground coal is added, the coal taking up or absorbing the gases—such as carbonic acid and the oxides of nitrogen, always present in sulphuric acid—and which are thrown off during the admixture of the raw phosphates and sulphuric acid. The gases being thus absorbed by the coal as they are evolved, the high degree of heat caused by such admixture is avoided. The powdered coal also serves to absorb moisture contained in the mixture during its manufacture. After the addition of coal to the compound nitrogenous matter—such as the flesh of dead animals, green or undried fish, horns, hoofs, &c.—may be added, and the finished product, whether nitrogenous material is added or not, is a fertilizer of superior quality.

I am aware that it has been proposed to use powdered coal as a fertilizer, and, if desired, to add some finished fertilizing compound to the coal immediately before being deposited in the ground. My invention differs materially from such a compound. By mixing the coal with the raw phosphate material while the latter is being chemically acted upon by sulphuric acid the coal becomes impregnated with the gases given off by such mixture, and the finished product is a totally different thing from a mixture of dry finished fertilizer and coal, and is far superior in the respects above set forth and in many other respects to the last-mentioned compound.

The fertilizing properties which are absorbed by the coal during the manufacture of the compound are retained by the coal and given off to advantage after the fertilizer shall have been applied to the plant. In other fertilizers, so far as I am aware, the volatile qualities escape and are lost during the manufacture of the compound.

Having fully described my invention, what I claim as new, and desire to secure by Letters Patent, is—

1. The process of making fertilizer, consisting in, first, subjecting raw phosphate material to the action of sulphuric acid, and, second, adding powdered coal while the chemical changes are taking place between the first-named ingredients, substantially as set forth.

2. The process of making fertilizer, consisting in, first, subjecting raw phosphate material to the action of sulphuric acid; second, adding powdered coal while the chemical changes are taking place between the first-named ingredients, and, third, adding nitrogenous material, substantially as set forth.

In testimony whereof I have signed this specification in the presence of two subscribing witnesses.

WILLIAM B. SEAL.

Witnesses:
FREDK. IBBOTT,
MICHAEL A. BOSMAN.